UNITED STATES PATENT OFFICE 2,594,905

ARC WELDING ELECTRODE

Charles J. Gallagher, Schenectady, N. Y., assignor to General Electric Company, a corporation of New York No Drawing. Application March 30, 1950, Serial No. 152,972

9 Claims. (Cl. 219—8)

This invention relates to inert gas arc welding. More particularly, it relates to an improved non-consumable electrode for inert gas-shielded arc welding and the process of making such electrode.

It has been known heretofore to use various cathode spot and arc stabilizing materials in conjunction with gas-shielded inert gas arc welding electrodes. Such a combination is disclosed in copending application Serial No. 76,085, filed February 12, 1949, now Patent Number 2,586,516 and sasigned to the same assignee as the present application. However, in the prior art the basic or current carrying electrode material has been fabricated from a high melting point metal having suitable electrical and thermal conductivities. Among the materials which have found the most widespread use in this respect are tungsten, tantalum and molybdenum. However, several disadvantages accompany the use of cores of arc stabilizing materials such as thoria in electrodes of high melting point metals such as those above. While the cathode spot and arc become initially well established, there is a tendency for the thoria to migrate onto the electrode metal itself. This results in a broadening of the electron emission zone which in turn permits and causes the cathode spot and arc to wander over the much greater emission area thus created instead of confining itself to the well defined and relatively small core surface area. As the electron emission area becomes larger and larger and spreads up the sides of the electrode, the arc is prone to burn and damage the welding torch nozzle and collet. Finally, the arc becomes so over-extended that it becomes extinguished. This wandering of the arc results in poor, uneven, irregular and interrupted welds. In order to produce good, regular welds, it is essential that the cathode spot be confined to a small area so that the spot and the arc fixed to it do not wander about. The only way in which the cathode spot and arc may be returned to the core is to remove that part of the core material which has migrated from the core proper. This may be accomplished by mechanical removal of the migrated material or by increasing the current in the electrode to the point where the thin film of migrated material is evaporated. Obviously, either of these methods is impractical in the midst of a welding operation and, at best, is only a temporary expedient inasmuch as the phenomenon soon recurs. Mechanical removal necessitates a complete interruption of the welding operation. While an increase in current intensity evaporates the spreading stabilizer and causes the cathode spot to return to the core, the excessive current produces a burned spot in the weld.

It is an object of this invention to provide an inert arc gas-shielded welding electrode in which migration of the arc is obviated.

It is a further object of the present invention to provide an arc stabilized inert gas-shielded welding electrode which is capable of instant arc starting at low currents.

It is another object of the invention to provide an inert arc gas-shielded welding electrode which will start an arc instantly at low open-circuit generator voltages.

Other objects will become apparent and the invention better understood from a consideration of the following description.

It has been found that electrodes for inert arc gas-shielded welding may be provided by using a core of thoria, zirconia or ceria in a hollow electrode of a metal which has a high heat conductivity and a low melting point relative to the thoria, zirconia or ceria core. Examples of metals which are suitable for the present purpose are copper, aluminum, steel, stainless steel, brass and silver among others which will occur to those skilled in the art. By the use of such high heat conductive, low melting point metals, any core material deposited thereon never reaches its melting point and cannot set up secondary regions, of electron emission. As a result the cathode spot and arc are maintained fixed to the core with no wandering or instability.

The use of relatively inexpensive low melting point metals as electrode materials represents a distinct advance over the use of the more expensive high melting point metal such as tungsten, tantalum and molybdenum.

It has been found, in general, that when the area of the core with relation to the cross-sectional area of the rod is about fifty per cent, the optimum current capacity is attained. Thus a copper rod three-sixteenths inch in diameter with a core 0.132 inch in diameter carries a current up to about 200 amperes D.-C. When the core is 0.094 inch in diameter for an area twenty-five per cent that of the rod, the cored rod carries up to about 150 amperes D.-C., and when the area of the core is about seventy-five per cent of the total area the current carrying capacity is again about 150 amperes D.-C. With a one-eighth inch diameter cored electrode, the maximum current carrying capacity again occurs when the area of the core is about fifty per cent of the total area of the cross section of the rod.

It will be understood, of course, that the size of the core used will depend upon the current necessary for any particular welding operation. In welding heavy material, larger currents must be used than when bonding thinner stock and the core may be made smaller. Where lower currents are indicated, the core may be made much smaller than fifty per cent of the cross-sectional area of the electrode since only a very small amount of arc stabilizing material is required to obtain a steady instant starting cathode spot and arc. Generally, the minimum amount of stabilizer required is about two to five per cent of the total volume of the rod.

The electrodes of this invention are made by simply coring low melting point, heat conductive metal rods and packing in the core the thoria, zirconia or ceria stabilizing material. The stabilizer should be compressed sufficiently so that it does not tend to crumble or fall out of the core under normal handling.

Electrodes made as described herein start an instant and stable cathode spot and arc under open circuit voltages as low as about twenty-one volts D.-C. in an argon shielding atmosphere. Using helium as the shielding gas, comparable performance is attained at open circuit generator voltages as low as fifty-five volts D.-C.

The present electrodes may be used in any conventional inert gas-shielded arc welding equipment. They are particularly useful in connection with automatic welding apparatus wherein the work and welding torch are started moving relative to one another as the high frequency arc-starting spark is struck.

Using the present electrodes, the cathode spot and arc are immediately established on the stabilizing core and continue uninterruptedly to produce uniform welds until the current is shut off. This action is in direct contrast to ordinary electrodes as of tungsten and the like. Using such electrodes, the arc has a tendency to hesitate in starting and to wander up the sides of the electrode damaging the torch and extinguishing frequently. The net result here is a non-uniform, incomplete and interrupted weld.

The present electrodes are also of particular value when stabilizing materials such as thoria are used in the core. Thoria, as pointed out above, when used in conjunction with tungsten and similar higher melting point metals under low currents, tends to migrate from the core over the tungsten, broadening the zone of electron emission and causing the arc to wander excessively which in turn produces poor and erratic welds. While the migrated thoria may be evaporated by increasing the electrode current, such a procedure would burn the material being welded. Mechanical removal of all thoria, except that in the core, is likewise impractical in the midst of a welding operation.

The use of a low melting point metal of high heat conductivity, such as described above with a core of thoria, obviates this difficulty. While the tungsten or high melting point metals operate at high enough temperatures so that the thoria which has migrated thereon can continue to emit electrons and cause arc wandering, in the present electrodes the copper, aluminum and stainless steel jackets remain so cool that the thoria cannot build up to a high enough temperature for electron emission. The cathode spot and arc are, therefore, confined to the core which constitutes the only electron emission source.

The electrodes of this invention are also particularly adapted for the welding of extremely thin metal stock which requires relatively low current intensities. Using a copper electrode, as described herein and cored with thoria, a stable, steady arc may be established at currents as low as 0.20 ampere D.-C.

The present electrodes do not depend on any so-called fluxing action for their operation. Neither the metal nor the stabilizing material enters the weld or acts in the removal of oxides or other impurities in the work piece, the only blanketing action being that of the inert gas itself. The present electrodes are also substantially non-consumable in that none of their constituents enter the weld.

What I claim as new and desire to secure by Letters Patent of the United States is:

1. A non-consumable cored inert gas shielded electrode which is capable of starting an arc instantly and maintaining a stable arc, said electrode comprising a metal having high heat conductivity and a low melting point relative to the core of the electrode, said core comprising a material selected from the group consisting of thoria, zirconia and ceria.

2. A non-consumable cored inert gas shielded electrode which is capable of starting an arc instantly and maintaining a stable arc, said electrode comprising a metal having a high heat conductivity and a low melting point relative to the core of the electrode selected from the class consisting of copper, aluminum, stainless steel, brass and silver, said core comprising material selected from the group consisting of thoria, zirconia and ceria.

3. A cored non-consumable inert gas shielded electrode which is capable of starting an arc instantly and maintaining a stable arc, said electrode comprising a metal of such heat conductivity and melting point that the core material selected from the group of materials consisting of thoria, zirconia and ceria cannot emit electrons when said core material is deposited thereon.

4. A cored non-consumable inert gas shielded arc welding electrode which is capable of starting an arc instantly and maintaining a stable arc, said electrode comprising a metal having a high heat conductivity and a low melting point relative to the core of the electrode, said core comprising a material selected from the group consisting of thoria, zirconia and ceria.

5. A non-consumable inert gas shielded arc welding electrode having instant starting and stable arc operating characteristics, said electrode comprising copper having a core of thoria.

6. A non-consumable inert gas shielded arc welding electrode having instant starting and stable arc operating characteristics, said electrode comprising stainless steel having a core of thoria.

7. A non-consumable inert gas shielded arc welding electrode having instant starting and stable arc operating characteristics, said electrode comprising copper having a core of zirconia.

8. A non-consumable inert gas shielded arc welding electrode which is capable of starting an arc instantly and maintaining a steady arc, said electrode comprising iron having a core of thoria.

9. A non-consumable inert gas shielded arc welding electrode having instant starting and stable arc operating characteristics, said electrode comprising stainless steel having a core of zirconia.

CHARLES J. GALLAGHER.

REFERENCES CITED

The following references are of record in the file of this patent:

UNITED STATES PATENTS

| Number | Name | Date |
|---|---|---|
| 1,467,825 | Armor | Sept. 11, 1923 |
| 1,501,266 | Brace | July 15, 1924 |
| 1,977,278 | Judy | Oct. 16, 1934 |
| 2,473,600 | Labosco | June 21, 1949 |
| 2,473,601 | Labosco | June 21, 1949 |